United States Patent
Thomas et al.

(10) Patent No.: US 9,059,878 B2
(45) Date of Patent: Jun. 16, 2015

(54) CODEBOOK FEEDBACK METHOD FOR PER-USER ELEVATION BEAMFORMING

(71) Applicant: Nokia Siemens Networks Oy, Espoo (FI)

(72) Inventors: Timothy A. Thomas, Palatine, IL (US); Bishwarup Mondal, Schaumburg, IL (US); Eugene Visotsky, Buffalo Grove, IL (US); Frederick W. Vook, Schaumburg, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 4 days.

(21) Appl. No.: 13/853,307

(22) Filed: Mar. 29, 2013

(65) Prior Publication Data

US 2013/0259151 A1    Oct. 3, 2013

Related U.S. Application Data

(60) Provisional application No. 61/617,930, filed on Mar. 30, 2012.

(51) Int. Cl.
| | |
|---|---|
| *H04B 7/02* | (2006.01) |
| *H04L 25/03* | (2006.01) |
| *H04B 7/04* | (2006.01) |
| *H04B 7/06* | (2006.01) |

(52) U.S. Cl.
CPC .......... *H04L 25/03949* (2013.01); *H04B 7/046* (2013.01); *H04B 7/0634* (2013.01); *H04B 7/0469* (2013.01); *H04B 7/0486* (2013.01); *H04B 7/063* (2013.01)

(58) Field of Classification Search
None
See application file for complete search history.

(56) References Cited

U.S. PATENT DOCUMENTS

| 7,450,066 | B2 | 11/2008 | Haskell | 342/368 |
|---|---|---|---|---|
| 8,041,395 | B2 | 10/2011 | Lo et al. | 455/562.1 |
| 8,831,125 | B2 | 9/2014 | Wernersson et al. | 375/267 |
| 2002/0159506 | A1 | 10/2002 | Alamouti et al. | 375/147 |
| 2013/0229980 | A1 | 9/2013 | Wernersson et al. | 370/328 |
| 2013/0258964 | A1 | 10/2013 | Nam et al. | 370/329 |
| 2013/0314792 | A1 | 11/2013 | Hu et al. | 359/557 |

OTHER PUBLICATIONS

Y. Zhang, et al., "Extension of 4-Tx Precoding Codebook to 8-Tx Downlink Closed-Loop MIMO", IEEE 2011, 4 pgs.
Y. Cheng, et al., "A Scalable Limited Feedback Design for Network MIMO using Per-Cell Product Codebook", IEEE Transactions on wireless Communications, vol. 9, No. 10, Oct. 2010, 15 pgs.
O. Yilmaz, et al., "System Level Analysis of vertical Sectorization for 3GPP LTE", IEEE 2009, pp. 453-457.

(Continued)

*Primary Examiner* — Adolf Dsouza
(74) *Attorney, Agent, or Firm* — Harrington & Smith

(57) ABSTRACT

A method of operating an array of antennas in a wireless communication system to provide user-specific azimuth and elevation beamforming is described. The method includes providing a product codebook structure consisting of both an azimuth and elevation portion. A receiver receives reference signals from a transmitter corresponding to both the azimuth and elevation portions of the array of antennas. The method also includes determining the index of the azimuth codebook portion of the product codebook from the azimuth portion of the received reference signals and determining the index of the elevation codebook portion of the product codebook from the elevation portion of the received reference signals. Apparatus and computer readable media are also described.

17 Claims, 8 Drawing Sheets

(56) References Cited

OTHER PUBLICATIONS

R1-111436, "Channel modeling considerations for vertical beamforming", Alcatel-Lucent Shanghai Bell,, Alcatel-Lucent, 3GPP TSG RAN WG1 Meeting RAN1#65, May 2011, 3 pgs.

Alcatel-Lucent Shanghai Bell et al: "Considerations on CSI feedback enhancements for high-priority antenna configurations"; 3GPP TSG-RAN WG1 #66, Athens, Greece; Aug. 22-26, 2011; 3GPP Draft, R1-112420; Chapters 2 and 5, pp. 1, 4-6; 3rd Generation Partnership Project (3GPP); Mobile Competence Centre; 650, Route des Lucioles; F-06921 Sophia-Antipolis Cedex; France.

"Draft Amendment to IEEE Standard for Information technology—Telecommunications and information exchange between systems—Local and metropolitan area networks—Specific requirements; Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension"; IEEE Draft, P802.15.3c/D02, Amendment to IEEE Std 802.15.3-2003; Oct. 24, 2008; pp. 1-264, especially p. 154-p. 160; p. 174-p. 175; IEEE SA, Piscataway, NJ, USA.

3GPP TS 36.300 V8.12.0 (Mar. 2010); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8);" Mar. 2010; pp. 1-149; 3rd Generation Partnership Project (3GPP); Mobile Competence Centre; 650, Route des Lucioles; F-06921 Sophia-Antipolis Cedex; France.

3GPP TS 36.300 V9.9.0 (Dec. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9);" Dec. 2011; pp. 1-174; 3rd Generation Partnership Project (3GPP); Mobile Competence Centre; 650, Route des Lucioles; F-06921 Sophia-Antipolis Cedex; France.

3GPP TS 36.300 V10.6.0 (Dec. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Dec. 2011; pp. 1-194; 3rd Generation Partnership Project (3GPP); Mobile Competence Centre; 650, Route des Lucioles; F-06921 Sophia-Antipolis Cedex; France.

3GPP TS 36.300 V11.0.0 (Dec. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Dec. 2011; pp. 1-194; 3rd Generation Partnership Project (3GPP); Mobile Competence Centre; 650, Route des Lucioles; F-06921 Sophia-Antipolis Cedex; France.

3GPP TR 36.913 V8.0.1 (Mar. 2009); "3rd Generation Partnership Project; Technical Specification Group Radio Access Network; Requirements for further advancements for Evolved Universal Terrestrial Radio Access (E-UTRA) (LTE-Advanced) (Release 8);" Mar. 2009; pp. 1-15; 3rd Generation Partnership Project (3GPP); Mobile Competence Centre; 650, Route des Lucioles; F-06921 Sophia-Antipolis Cedex; France.

3GPP TR 36.913 V9.0.0 (Dec. 2009); "3rd Generation Partnership Project; Technical Specification Group Radio Access Network; Requirements for further advancements for Evolved Universal Terrestrial Radio Access (E-UTRA) (LTE-Advanced) (Release 9);" Dec. 2009; pp. 1-15; 3rd Generation Partnership Project (3GPP); Mobile Competence Centre; 650, Route des Lucioles; F-06921 Sophia-Antipolis Cedex; France.

3GPP TR 36213 V10.0.0 (Mar. 2011); "3rd Generation Partnership Project; Technical Specification Group Radio Access Network; Requirements for further advancements for Evolved Universal Terrestrial Radio Access (E-UTRA) (LTE-Advanced) (Release 10);" Mar. 2011; pp. 1-15; 3rd Generation Partnership Project (3GPP); Mobile Competence Centre; 650, Route des Lucioles; F-06921 Sophia-Antipolis Cedex; France.

CODEBOOK FEEDBACK METHOD FOR PER-USER ELEVATION BEAMFORMING

CROSS-REFERENCE TO RELATED APPLICATIONS

This patent application claims priority under 35 U.S.C. §119(e) from U.S. Provisional Patent Application No. 61/617,930, filed Mar. 30, 2012, the disclosure of which is incorporated by reference herein in its entirety.

TECHNICAL FIELD

The exemplary and non-limiting embodiments relate generally to wireless communication systems, methods, devices and computer programs and, more specifically, relate to a codebook structure for joint elevation and azimuth beamforming.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BF beamforming
BS base station
BW bandwidth
CB codebook
CC component carrier
CDM code division multiplexing
CQI channel quality indicator
CRS common reference signal
CSI channel state information
DL downlink (eNB towards UE)
eNB E-UTRAN Node B (evolved Node B)
EPC evolved packet core
E-UTRAN evolved UTRAN (LTE)
FDD frequency division duplex
HARQ hybrid automatic repeat request
IMT-A international mobile telephony-advanced
ITU international telecommunication union
ITU-R ITU radiocommunication sector
LOS line of sight
LTE long term evolution of UTRAN (E-UTRAN)
MAC medium access control (layer 2, L2)
MM/MME mobility management/mobility management entity
NLOS non-line-of-sight
Node B base station
O&M operations and maintenance
OFDMA orthogonal frequency division multiple access
PDCP packet data convergence protocol
PHY physical (layer 1, L1)
PMI precoder matrix index
RLC radio link control
RRC radio resource control
RRM radio resource management
RS reference signal
RX receiver
SC-FDMA single carrier, frequency division multiple access
S-GW serving gateway
SNR signal to noise ratio
SRS sounding reference signal
TDD time division duplex
TX transmitter
UE user equipment, such as a mobile station or mobile terminal
UL uplink (UE towards eNB)
UMa urban macro
UTRAN universal terrestria adio access network
XPol cross polarized The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.12.0 (2010-04), "3rd Generation Partnership Project; Technical Specification Group Radio Access Network; Evolved Universal Terrestrial Radio Access (E UTRA) and Evolved Universal Terrestrial Access Network (E-UTRAN): Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300. V9.9.0 (2011-12), incorporated by reference herein in its entirety, and Release 10 versions of at least some of these specifications have been published including 3GPP TS 36.300, V10.6.0 (2011-12), incorporated by reference herein in its entirety. Even more recently, Release 11 versions of at least some of these specifications have been published including 3GPP TS 36.300, V11.0.0 (2011-12), incorporated by reference herein in its entirety.

FIG. 1 reproduces Figure 4-1 of 3GPP TS 36.300, and shows the overall architecture of the E-UTRAN system 100. The E-UTRAN system 100 includes eNBs 120, 124, 128, providing the E-UTRA user plane (PDCP/RLC/MAC/PHY) and control plane (RRC) protocol terminations towards the UE (not shown). The eNBs 120, 124, 128 are interconnected with each other by means of an X2 interface 130. The eNBs are also connected by means of an S1 135 interface to an EPC, more specifically to a MME (Mobility Management Entity) 110, 115 by means of a S1 MME interface 135 and to a Serving Gateway (SGW) 110, 115 by means of a S1 interface 135. The S1 interface 135 supports a many-to-many relationship between MMEs/S-GW 110, 115 and eNBs 120, 124, 128.

The eNB hosts the following functions:
functions for RRM: Radio Bearer Control, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009 03), 3rd Generation Partnership Project; Technical Specification Group Radio Access Network; Requirements for Further Advancements for E-UTRA (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A will most likely be part of LTE Rel-10. LTE-A will be a more optimized radio system fulfilling the ITU-R requirements for IMT-A while maintaining backward compatibility with LTE Rel-8. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety, Typical antenna deployments consist of an array of horizontally arranged antenna elements that are processed for adaptivity in the azimuth dimension. Recent architectures have been proposed for creating arrays that effectively consist of antenna elements arranged both vertically and horizontally, which therefore promise the ability to adapt in both azimuth and elevation dimensions.

The traditional systems are oriented towards controlling the elevation in a sector-specific manner with respect to vertical beamforming, not a user-specific manner. Standard two-dimensional beamforming would require a transceiver behind every logical antenna element, whereas using the beamspace concept (described below) can significantly reduce the number of required transceivers. Current codebook designs are not optimized for the joint beamforming of azimuth and elevation dimensions and in general consider only the azimuth dimension.

A user-specific vertical beamforming system may use the uplink of an FDD system to determine an elevation beamformer. However, this does not enable direct measurement of the elevation channel by the UE. Additionally, calibration and complex mapping between different uplink and downlink channels may be required.

Other existing LTE codebooks are designed for linear arrays without consideration for the elevation dimension and hence are not optimal for managing the azimuth plus elevation problem. Also, the addition of antenna ports in the elevation dimension may result in the total number of ports being larger than or different from the number of ports supported by the defined codebooks in LTE.

Traditional approaches in codebook design have presented a product codebook structure for eight azimuth antennas but these approaches do not address procedures needed to support adaptation in elevation. Other traditional approaches for vertical beamforming propose creating additional antenna ports in elevation through the use of beamspace elevation beams but lack discussion of codebooks.

While some conventional techniques use codebooks, they are not optimized for both elevation and azimuth beamforming. Also, there is a limited number of codebook sizes available for the existing conventional codebooks.

What is needed is a technique that provides codebook structures for joint elevation and azimuth beamforming.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method of operating an array of antennas in a wireless communication system to provide user-specific azimuth and elevation beamforming. The method includes providing a product codebook structure consisting of both an azimuth and elevation portion. A receiver receives reference signals from a transmitter corresponding to both the azimuth and elevation portions of the array of antennas. The method also includes determining the index of the azimuth codebook portion of the product codebook from the azimuth portion of the received reference signals and determining the index of the elevation codebook portion of the product codebook from the elevation portion of the received reference signals.

In another aspect thereof an exemplary embodiment provides a method for utilizing a codebook structure for joint elevation and azimuth beamforming. The method includes receiving at least one RS. The at least one RS corresponds to an azimuthal portion of an array of antennas and corresponds to an elevational portion of the array of antennas. The method also includes determining an index of an azimuthal portion of a CB based at least in part on the at least one RS and determining an index of an elevational portion of the CB based at least in part on the at least one RS.

In a further aspect thereof an exemplary embodiment provides a method for utilizing a codebook structure for joint elevation and azimuth beamforming. The method includes sending at least one RS to a mobile device. The at least one RS corresponds to an azimuthal portion of an array of antennas and corresponds to an elevational portion of the array of antennas. Receiving feedback from the mobile device is included in the method. The feedback is based on an azimuthal portion of a CB and an elevational portion of the CB. The method also includes beamforming a signal in an azimuthal direction based at least in part on the azimuthal portion of a CB and beamforming the signal in an elevational direction based at least in part on the elevational portion of a CB.

In another aspect thereof an exemplary embodiment provides an apparatus for utilizing a codebook structure for joint elevation and azimuth beamforming. The apparatus includes at least one processor and at least one memory storing computer program code. The at least one memory and the computer program code are configured to, with the at least one processor, cause the apparatus to perform actions. The actions include receiving at least one RS. The at least one RS corresponds to an azimuthal portion of an array of antennas and corresponds to an elevational portion of the array of antennas. The actions also include determining an index of an azimuthal portion of a CB based at least in part on the at least one RS and determining an index of an elevational portion of the CB based at least in part on the at least one RS.

In a further aspect thereof an exemplary embodiment provides an apparatus for utilizing a codebook structure for joint elevation and azimuth beamforming. The apparatus includes at least one processor and at least one memory storing computer program code. The at least one memory and the computer program code are configured to, with the at least one processor, cause the apparatus to perform actions. The actions include sending at least one RS to a mobile device. The at least one RS corresponds to an azimuthal portion of an array of antennas and corresponds to an elevational portion of the array of antennas. Receiving feedback from the mobile device is included in the actions. The feedback is based on an azimuthal portion of a CB and an elevational portion of the CB. The actions also include beamforming a signal in an azimuthal direction based at least in part on the azimuthal portion of a CB and beamforming the signal in an elevational direction based at least in part on the elevational portion of a CB.

In another aspect thereof an exemplary embodiment provides a computer readable medium for utilizing a codebook structure for joint elevation and azimuth beamforming. The computer readable medium is tangibly encoded with a computer program executable by a processor to perform actions. The actions include receiving at least one RS. The at least one RS corresponds to an azimuthal portion of an array of antennas and corresponds to an elevational portion of the array of antennas. The actions also include determining an index of an azimuthal portion of a CB based at least in part on the at least one RS and determining an index of an elevational portion of the CB based at least in part on the at least one RS.

In a further aspect thereof an exemplary embodiment provides a computer readable medium for utilizing a codebook structure for joint elevation and azimuth beamforming. The computer readable medium is tangibly encoded with a computer program executable by a processor to perform actions. The actions include sending at least one RS to a mobile device. The at least one RS corresponds to an azimuthal portion of an array of antennas and corresponds to an elevational portion of the array of antennas. Receiving feedback from the mobile device is included in the actions. The feedback is based on an azimuthal portion of a CB and an elevational portion of the CB. The actions also include beamforming a signal in an azimuthal direction based at least in part on the azimuthal portion of a CB and beamforming the signal in an elevational direction based at least in part on the elevational portion of a CB.

In another aspect thereof an exemplary embodiment provides an apparatus for utilizing a codebook structure for joint elevation and azimuth beamforming. The apparatus includes means for receiving at least one RS. The at least one RS corresponds to an azimuthal portion of an array of antennas and corresponds to an elevational portion of the array of antennas. The apparatus also includes means for determining an index of an azimuthal portion of a CB based at least in part on the at least one RS and means for determining an index of an elevational portion of the CB based at least in part on the at least one RS.

In a further aspect thereof an exemplary embodiment provides an apparatus for utilizing a codebook structure for joint elevation and azimuth beamforming. The apparatus includes means for sending at least one RS to a mobile device. The at least one RS corresponds to an azimuthal portion of an array of antennas and corresponds to an elevational portion of the array of antennas. Means for receiving feedback from the mobile device is included in the apparatus. The feedback is based on an azimuthal portion of a CB and an elevational portion of the CB. The apparatus also includes means for beamforming a signal in an azimuthal direction based at least in part on the azimuthal portion of a CB and means for beamforming the signal in an elevational direction based at least in part on the elevational portion of a CB.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

Various exemplary embodiments employ beamspace to create two or ore horizontal arrays arranged for elevation adaptivity. Controlling the array for user-specific adaptivity is done by using a codebook which is designed to beamform in both the azimuth and elevation dimensions jointly. Additionally, the codebook may be used to make preceding matrix index (PMI) calculations and CQI and rank determination for the azimuth and elevation codebook structure.

An advantage of per-user optimization is a more tailored control of the elevation pattern to further optimize the link to a UE. Beamspace processing enables for using fewer transceivers than the traditional approaches. Using a codebook (CB) for azimuth and elevation beamforming, the UE, which is in the best position to measure the downlink channel, can determine the beamforming weights (PMI), the CQI and the preferred rank (number of streams used) using a product codebook design which enables a low-complexity PMI search.

Figure 2:
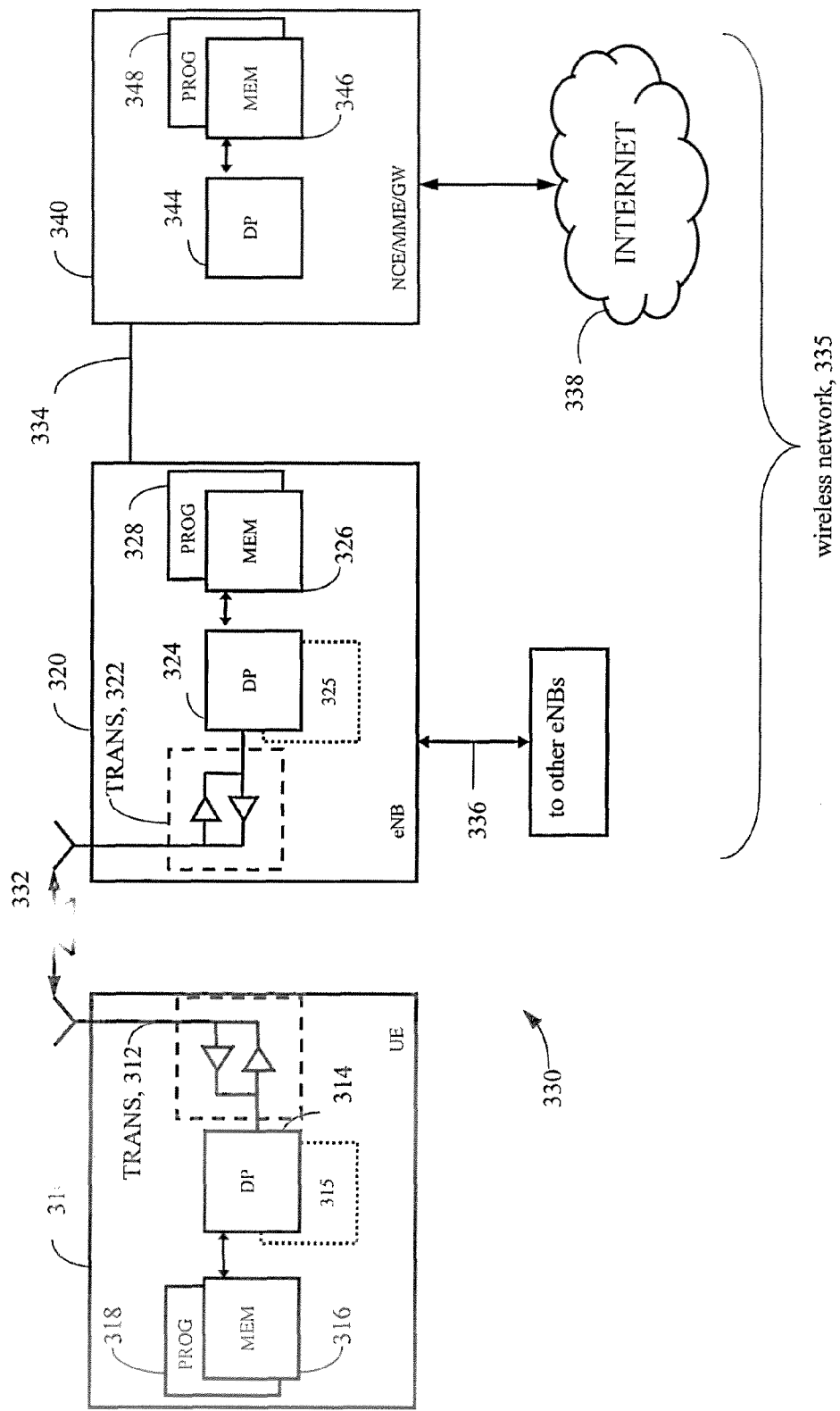
FIG. 2 shows a simplified block diagram of exemplary electronic devices that are suitable for use in practicing various exemplary embodiments.

Before describing in further detail various exemplary embodiments, reference is made to FIG. 2 for illustrating a simplified block diagram of various electronic devices and apparatus that are suitable for use in practicing exemplary embodiments.

Figure 1:
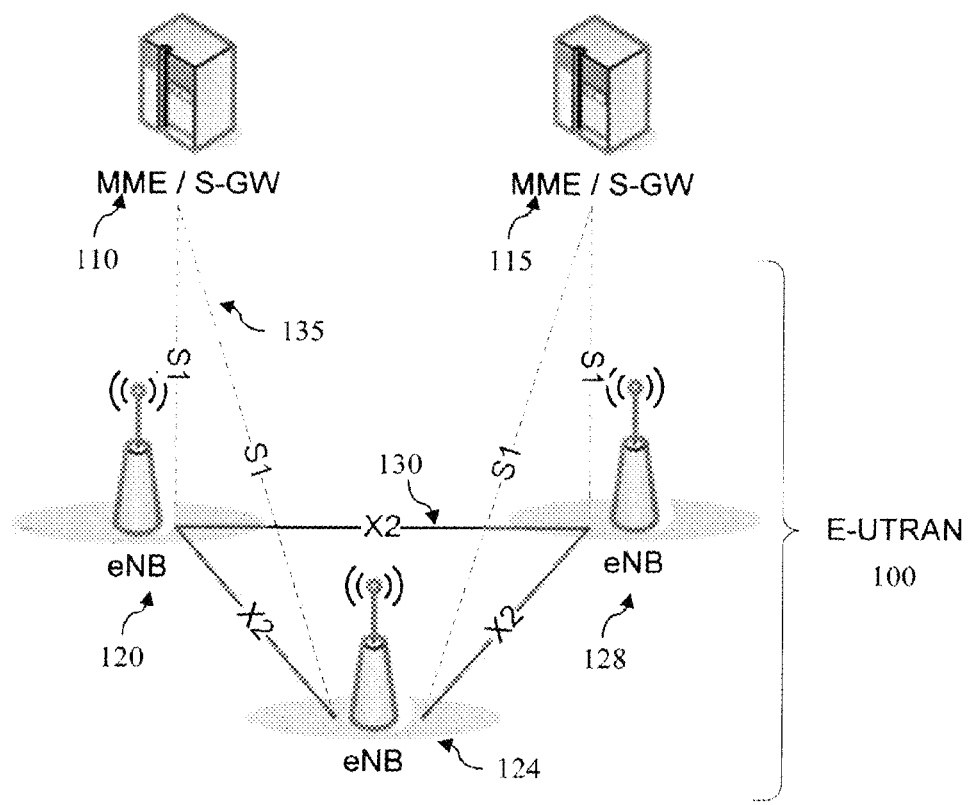
FIG. 1 reproduces FIG. 4-1 of 3GPP TS 36.300, and shows the overall architecture of the E-UTRAN system.

In the wireless system 330 of FIG. 2, a wireless network 335 is adapted for communication over a wireless link 332 with an apparatus, such as a mobile communication device which may be referred to as a UE 310, via a network access node, such as a Node B (base station), and more specifically an eNB 320. The network 335 may include a network control element (NCE) 340 that may include the MME/SGW functionality shown in FIG. 1, and which provides connectivity with a network, such as a telephone network and/or a data communications network (e.g., the internet 338).

The UE 310 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the eNB 320 via one or more antennas.

The eNB 320 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 310 via one or more antennas. The eNB 320 is coupled via a data control path 334 to the NCE 340. The path 334 may be implemented as the S1 interface shown in FIG. 1. The eNB 320 may also be coupled to another eNB via data control path 336, which may be implemented as the X2 interface shown in FIG. 1.

The NCE 340 includes a controller, such as a computer or a data processor (DP) 344, a computer-readable memory medium embodied as a memory (MEM) 346 that stores a program of computer instructions (PROG) 348.

At least one of the PROGs 318, 328 and 348 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 314 of the UE 310; by the DP 324 of the eNB 320; and/or by the DP 344 of the NCE 340, or by hardware, or by a combination of software and hardware (and firmware).

The UE 310 and the eNB 320 may also include dedicated processors, for example codebook processor 315 and codebook processor 325.

In general, the various embodiments of the UE 310 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Figure 3:
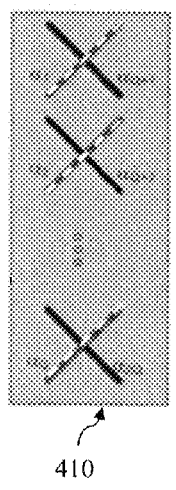
FIG. 3 provides an overview of a conventional antenna panel design.
Figure 3:
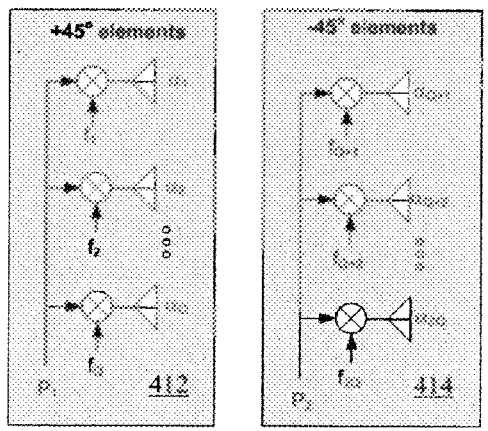
Figure 3:

FIG. 3 provides an overview of a conventional antenna panel design. A physical XPOL Antenna Panel 410 is typically comprised of multiple +45° antenna sub-elements (shown with dashed lines) and multiple −45° antenna sub-elements (shown with solid lines). By +45° it is meant that the antenna sub-element transmits with a +45° diagonal polarization and by −45° it is meant that the antenna sub-element transmits with a −45° diagonal polarization. The +45° sub-elements are phased to form a logical +45° antenna 412 and the −45° sub-elements are phased to form a logical −45° antenna 414. The result is a pair of logical antennas 416. When referring to azimuth ports or antennas in what follows, azimuth will refer to both polarization and also to antenna elements spaced in the azimuth dimension.

A similar concept applies to a panel array containing co-polarized vertical elements (not shown) rather than the cross-polarized vertical elements in FIG. 3. The phasing of the vertical elements is intended to create a specific antenna pattern in the elevation dimension. The use of a mechanical downtilt can also be used to optimize cell coverage. The elevation pattern is typically very narrow in macrocells in order to increase the overall antenna gain and to cover the cell from a high tower.

Within an antenna panel multiple-beams may be created per polarization +45°/−45° via multi-beam phasing of the co-pol elements inside the XPOL panel. Each elevation beam for a given polarization may be formed using all the elements of that polarization. Alternatively, each beam for a given polarization may use a non-overlapping subset of the sub-elements. The beams are designed to be orthogonal to each other. The result in the panel is an array that logically consists of E vertical elements for each of the two polarizations. The array at the eNB can consist of multiple panels to provide azimuth elements.

Beamspace processing creates fee fewer inputs/outputs (e.g., E) from an array of Q vertically-orientated antennas (where E is less than Q) by combining the Q physical antennas using E beams. The beams may be applied at radio frequencies (RFs) to the physical antennas so that RF transmit receive chains are employed after the beamspace combining is already done. In equation form, the received signal for the +45 polarization on the $b^{th}$ beamspace beam can be expressed as:

$$y(t) = f_b^H y(t),$$

where $f_b$ is the Q×1 vector of weights for beam b and y(t) is the Q×1 received RF signal at time t on the physical antennas for the +45 polarization. For beamspace processing at the transmitter, the transmitted signal from the physical antennas for the −45 polarization is given as:

$$Q \times 1 z(t) = \sum_{b=1}^{E} z_b(t) f_b^*,$$

where $z_b(t)$ is the RF signal sent on the $b^{th}$ beam.

There are two main advantages of beamspace processing at RF. The first advantage is that the dimension of the receive or transmit processing is decreased which results in a significant computational savings and much fewer RF components. The second advantage is that the smaller dimension means fewer parameters (e.g., receive weights applied to $y_b(t)$) need to be estimated and hence a larger gain over noise is typically seen relative to working in the higher dimension space needed without beamspace processing.

Figure 4:
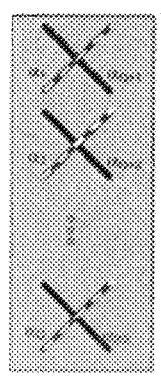
FIG. 4 is useful when explaining a method to achieve an elevational beamforming architecture and implementation.
Figure 4:
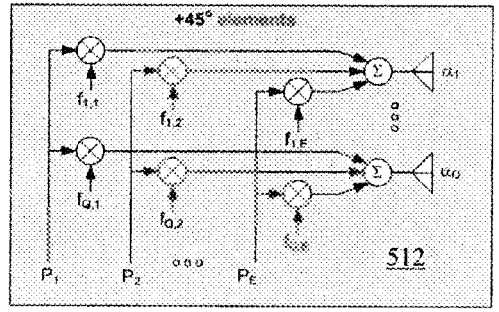
Figure 4:
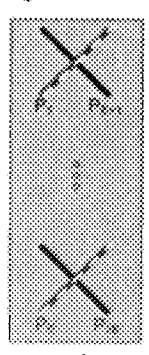
Figure 4:
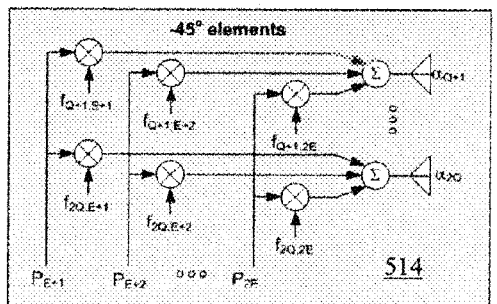

FIG. 4 is useful when explaining an elevational beamforming architecture and implementation using beamspace processing. In general, this involves creating multiple-beams per polarization via phasing of the co-pol sub-elements. In FIG. 4, each elevation beam for a given polarization is formed using all of the sub-elements of that polarization. Each panel 512, 514 contains some number of vertical elements for each of the two polarizations. The array at the eNB can then have multiple panels to provide elements in azimuth.

As shown, there are 2Q total sub-elements in the panel 510 with Q elements per polarization in the panel 512, 514. The effect is to form E beams from the Q elements for each polarization, and the result is that the panel forms a logical E×2 vertical array of cross pols 516. Tx weights are applied to the inputs to the logical cross pols (e.g., ports $P_1 \ldots P_{2E}$) to beamform in the elevation dimension. The Tx weights that form the logical cross pol antennas (e.g., the weights $f_{11} \ldots f_{QE}$) are typically applied at the RF level (e.g., after upmixing), whereas the Tx weights that are applied to the input to the logical cross pol ports (not shown in the figure) are typically applied at the baseband level.

The structure described in FIG. 4 creates an antenna panel array that logically consists of E vertical elements for each of two polarizations, e.g., for the XPOL case: +/−45. Other techniques can also be used to create an antenna architecture capable of supporting vertical beamforming. For example, a simple method is simply to arrange a set of physical cross pol elements in a two-dimensional layout that consist of M elements in azimuth and E elements in elevation. The feedback methods and codebooks in this invention can be applied to any array architecture having a two-dimensional layout.

Figure 7:
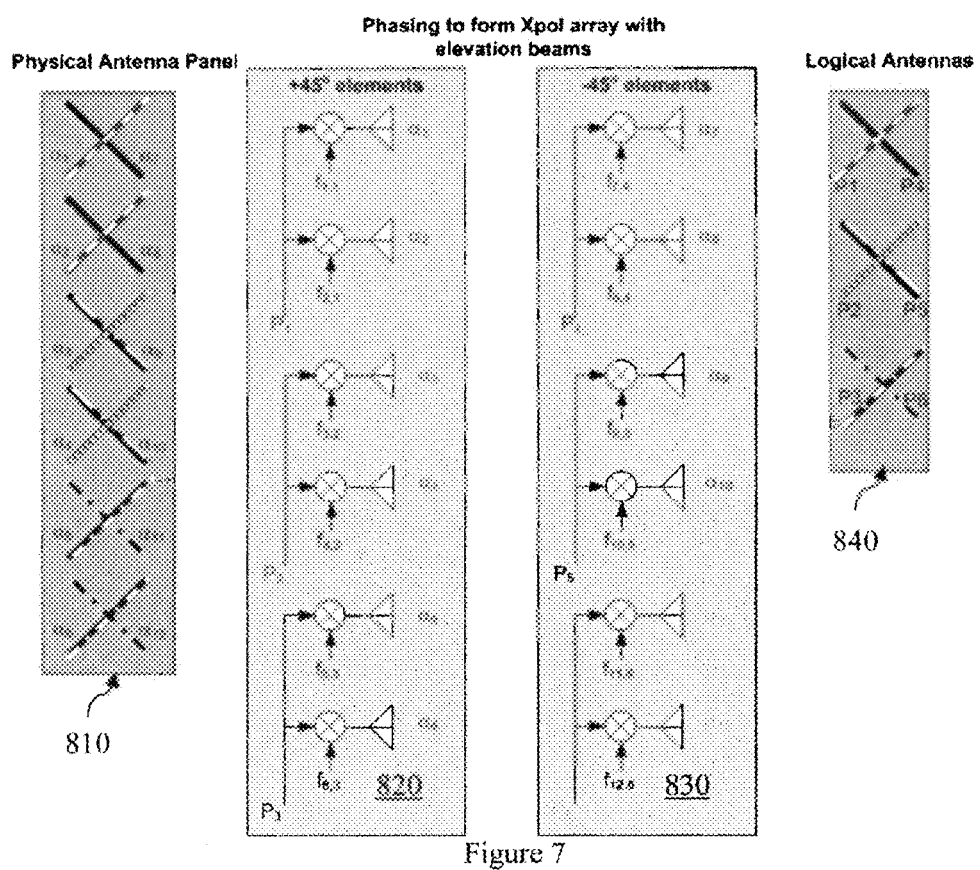
FIG. 7 illustrates a method to achieve an elevational beamforming architecture and implementation.

FIG. 7, similar to FIG. 4, is useful when explaining another elevational beamforming architecture and implementation. As shown, Q=6 elements per polarization (12 total sub-elements) are in the panel 810. E=3 beams are formed per polarization, each from two of the sub-elements with that polarization 820, 830, and the result is that the panel forms a logical E×2 vertical array of cross pols 840. Tx weights are applied to the inputs of the beams (e.g., ports $P_1 \ldots P_6$) to beamform in the elevation dimension. In contrast to the implementation shown in FIG. 4, FIG. 7 offers fewer construction requirements, for example, no summer is needed in the antenna.

As noted above, traditional techniques adapt the elevation pattern on a per-sector basis, not on a per-user basis and therefore contain no reference signal design and associated signaling aimed at per-user joint elevation/azimuth adaptivity. The per-user azimuth/elevation optimization enables a more tailored control of the elevation pattern to further optimize the link to a UE. Also, efficient reference signal structures can be defined which have significantly lower overhead than sounding all combinations of azimuth and elevation ports.

Figure 5:
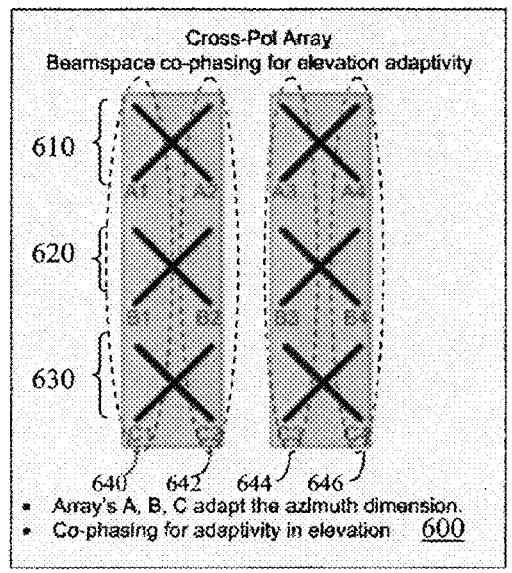
FIG. 5 provides an overview of an exemplary embodiment of a cross-pol array.

FIG. 5 provides an overview of an exemplary embodiment of a cross-pol array 600 using beamspace co-phasing for elevation and azimuth adaptivity. The overall logical array structure can be partitioned into sub-arrays in the elevation dimension (e.g., 3 arrays: Array A 610, Array B 620 and Array C 630) and also partitioned into sub-arrays in the azimuth dimension (e.g., 4 arrays: Array-1 640, Array-2 642, Array-3 644, and Array-4 646). This allows control of both azimuth (for example, using arrays 1-4 640, 642, 644, 646) and elevation (using arrays A-C 610, 620, 630) at the eNB. The logical array structure may be extended for additional azimuthal ports (e.g., ports 0-7, etc.) and/or for additional elevation arrays. Note that for the present discussion, the array in FIG. 5 can be created via beamspace techniques or any of the other methods described above.

Figure 6:
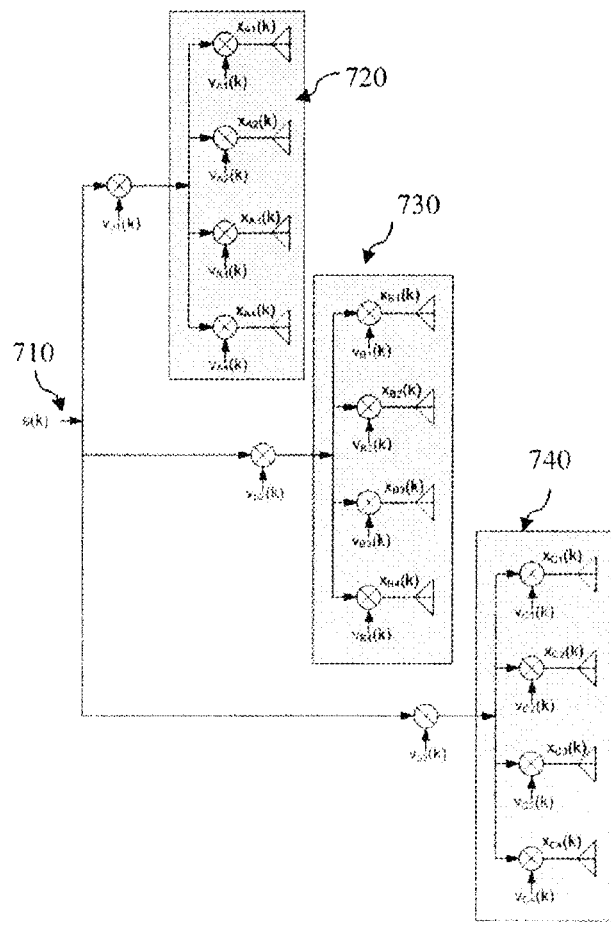
FIG. 6 illustrates controlling an antenna array for rank 1 3D-MIMO.

FIG. 6 shows an example for controlling a rank 1 M=4, E=3 array. As shown, an input such as stream 710, s(k), is applied to the E elevation sub-arrays 720, 730 and 740. Each elevation sub-array 720, 730, 740 has an associated M=4 element sub-array weight vector: $V_A$, $V_B$, $V_C$, defined as follows:

$$V_A(k) = \begin{bmatrix} V_{A1}(k) \\ \vdots \\ V_{AM}(k) \end{bmatrix}, V_B(k) = \begin{bmatrix} V_{B1}(k) \\ \vdots \\ V_{BM}(k) \end{bmatrix}, V_C(k) = \begin{bmatrix} V_{C1}(k) \\ \vdots \\ V_{CM}(k) \end{bmatrix}, etc.$$

where the index k refers to time and/or frequency (e.g., time symbol, OFDM subcarrier, OFDMA resource block, etc.). The E=3 sub-arrays 720, 730, 740 are then steered with another E=3 element weight vector: $V_p(k)$ defined as follows:

$$V_p(k) = \begin{bmatrix} V_{p1}(k) \\ \vdots \\ V_{pE}(k) \end{bmatrix}.$$

It can be noted that thus far this notational framework for defining the transmit weights is suitable for any strategy for computing the transmit weights. In other words, any transmit weight vector of length M×E for the M×E-element antenna array can be decomposed into the above structure by simply setting $V_p(k)$ to be all ones and by setting the weights in each elevation sub-array 720, 730, 740 to the appropriate value.

However, for jointly controlling azimuth and elevation the use of a simplified strategy may be employed in which the E elevation sub-arrays are first beamformed in the azimuth dimension with identical weight vectors (e.g., for E=3: $V_A=V_B=V_C$) to form E identical beams in elevation. These E elevation beams are then beamformed together (e.g., "co-phased") with the E-element weight vector $V_p(k)$.

Figure 9:
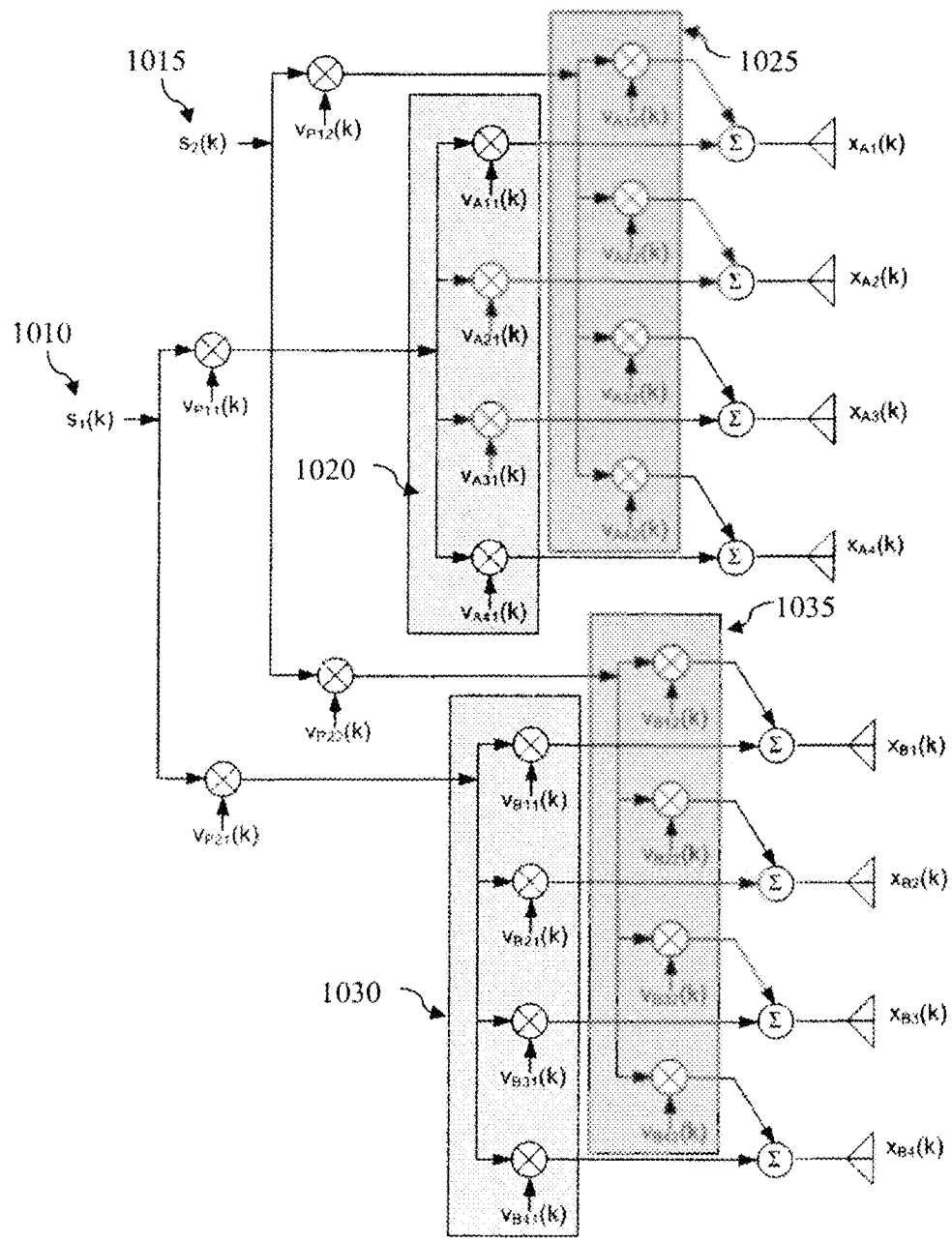
FIG. 9 illustrates controlling an antenna array for rank 2 3D-MIMO.

FIG. 9 shows an example for controlling an M=4, E=2 array for rank=2 transmission. The rank is equal to the number of spatial multiplexing streams (Ns). As shown, a first spatial multiplexing stream 1010, $s_1(k)$, is applied to E elevation sub-arrays using the azimuth beamformers 1020 and 1030. A second spatial multiplexing stream 1015, $s_2(k)$, is also applied to the E elevation sub-arrays using the azimuth beamformers 1025 and 1035. Each azimuth beamformer 1020 and 1025, 1030 and 1035 has an associated M×1 (e.g., 4×1) azimuth beamformer weight vector: $V_{A1}(k)$, $V_{A2}(k)$, $V_{B1}(k)$, $V_{B2}(k)$ respectively defined as follows:

$$V_A(k) = \begin{bmatrix} V_{A11}(k) & \ldots & V_{A1Ns}(k) \\ \vdots & & \vdots \\ V_{AM1}(k) & \ldots & V_{AMNs}(k) \end{bmatrix},$$

$$V_B(k) = \begin{bmatrix} V_{B11}(k) & \ldots & V_{B1Ns}(k) \\ \vdots & & \vdots \\ V_{BM1}(k) & \ldots & V_{BMNs}(k) \end{bmatrix},$$

where $V_A(k)=[V_{A1}(k), \ldots, V_{AM}(k)]$, $V_B(k)=[V_{B1}(k), \ldots, V_{BM}(k)]$ and the index k refers to time and/or frequency (e.g., time symbol, OFDM subcarrier, OFDMA resource block, etc.). The 2 azimuth beamformers 1020 and 1030 are then steered with another E=2 element weight vector, $V_{P1}(k)$ $V_{p1}(k)$. Likewise the 2 azimuth beamformers 1025 and 1035 are then steered with a different E=2 element weight vector, $V_{p2}(k)$. $V_{pi}(k)$ is defined as follows:

$$V_{p_i}(k) = \begin{bmatrix} V_{p1i}(k) \\ \vdots \\ V_{pEi}(k) \end{bmatrix}.$$

A rank 2 transmit weight vector may be determined using the rank 2 $V_A(k)$, $V_V(k)$, ... and $V_{pi}(k)$. For the example of FIG. 9, the transmit weights used by the eNB are:

$$\begin{bmatrix} v_{p11}(k)v_{A1}(k) \\ v_{p21}(k)v_{B1}(k) \end{bmatrix} \text{ and } \begin{bmatrix} v_{p12}(k)v_{A2}(k) \\ v_{p22}(k)v_{B2}(k) \end{bmatrix},$$

for streams 1 and 2 respectively, where vAi(k) is the ith column of VA(k), and vBi(k) is the ith column of VB(k).

In a different embodiment both of the elevation weights in the rank 2 case may be equal (e.g., $Vp1(k)=Vp2(k)$). Making the two elevation weights be equal would result in less feedback needed from the UE to control the array at the eNB. Note that the extension to an arbitrary rank (e.g., a rank greater than 2) would directly follow from the above rank 2 description and the example shown in FIG. 9.

In order to provide user-specific vertical and azimuth beamforming for an array of logical antenna elements, the vertical and azimuth beamforming may be controlled using a codebook structure which separates azimuth and elevation dimensions in the codebook design. The overall logical array structure of the logical antenna elements can be partitioned into sub-arrays (e.g. 3 arrays: Array A, Array B, Array C as in the example shown in FIG. 5). The sub-arrays may be separated into azimuthal sub-arrays and elevational sub-arrays and an individual logical antenna element may be used in both an azimuthal sub-array and an elevational sub-array.

A product codebook (CB) is designed so that one dimension is used to control elevation, for example, using E×1 vectors ($v_p$) where E is the number of elevation antennas, beams or ports, and another dimension is used to control azimuth, for example, using M×1 vectors ($V_A$ through $V_C$) where M is the number of azimuth antennas or ports. The azimuth vectors may all be equal ($V_A=V_B=V_C$) but in general will not be all equal.

An exemplary EM×1 CB weight vector for the rank 1 case (where rank means the number of spatial streams) is given as:

$$\begin{bmatrix} v_{p1}(k)V_A(k) \\ v_{p2}(k)V_B(k) \\ v_{p3}(k)V_C(k) \end{bmatrix},$$

where $v_{pn}$ a complex scalar and the $n^{th}$ element of $v_p$. This may be considered as a product of an elevation portion:

$v_{p1}(k)$
$v_{p2}(k)$
$v_{p3}(k)$, and an azimuthal portion:

$V_A(k)$ $V_B(k)$ $V_C(k)$.

Note that in the case where all azimuth vectors are equal ($V_A=V_B=V_C$) that the exemplary EM×1 CB weight vector may also be considered as the kronecker product of the vector $v_p$ with the azimuthal portion $V_A$.

The preferred index in the elevation codebook may be fed back at a different rate than the preferred index in the azimuth CB. For example, the UE may be configured to provide feedback regarding elevation at a slower rate than when the UE provides feedback regarding elevation.

The elevation CB weight vector can be represented by an index e-PMI (elevation precoder matrix index) and the azimuth CB weight vector can be represented by an index a-PMI (azimuth precoder matrix index). In a particular embodiment e-PMI and a-PMI can be fed back from an UE as part of two separate messages in the uplink, for example in two distinct time instants. In a particular embodiment e-PMI and a-PMI can be fed back from an UE in the same time instant. In this case e-PMI and a-PMI can also be jointly coded. In another embodiment either e-PMI or a-PMI or both can be jointly coded with another feedback element for example RI (rank indicator).

In a particular embodiment only a subset of possible e-PMIs may be allowed to be selected. This subset of e-PMIs may depend on other aspects—for example it may depend on a subset of a-PMIs or on RI.

Since each dimension is treated separately, the CB may be kept small. By partitioning the codebook, a CB search can also be broken up into elevation and azimuth dimensions separately enabling a lower complexity search. Such a lower complexity search is particularly appropriate when e-PMI and a-PMI are requested to be fed back at different time instants (as different messages). This is relevant for periodic feedback. Alternatively if e-PMI and a-PMI are requested to be fed back at the same time instant a UE may jointly search for e-PMI and a-PMI. This is relevant for aperiodic feedback.

A detailed example of the CB feedback methodology for elevation and azimuth beamforming is now given. Consider the case of M=4 azimuth antennas and E=3 elevation antennas. The UE may first receive some CSI-RS which sounds the azimuth dimension. Then at the same or different time the UE may receive some CSI-RS which sounds the elevation dimension. The UE may next make a decision on the best rank from the CSI-RS for both dimensions. Then for the determined rank the UE may determine the best azimuth CB using the azimuth CSI-RS and the best elevation CB using the elevation CSI-RS. The UE may then determine a CQI for the chosen rank based on the best azimuth CB index and the best elevation CB index. The mobile may also use techniques similar to CQI determination to evaluate portions of the frequency band to arrive at UE selected subband feedback.

The CSI-RS sounding the azimuth dimension and the CSI-RS sounding the elevation dimension can be part of two separate CSI-RS resource configurations. A CSI-RS resource configuration is defined as a set of CSI-RS periodicity, offset, resource locations within a subframe, antenna ports. Then the CQI and rank as defined earlier will be associated with multiple CSI-RS resource configurations.

For the above example of M=4 and E=3 and assuming frequency-non-selective feedback, the received signal at the mobile is given by:

$$y(k) = [H_A(k) | H_B(k) | H_C(k)] \begin{bmatrix} V_A & 0 & 0 \\ 0 & V_B & 0 \\ 0 & 0 & V_C \end{bmatrix} \begin{bmatrix} (v_p)_1 I_r \\ (v_p)_2 I_r \\ (v_p)_3 I_r \end{bmatrix}$$

where y(k) is $M_R \times 1$ ($M_R$ is the number of receive antennas at the mobile), $H_A(k)$, $H_B(k)$, and $H_C(k)$ are the $M_R \times (M*E)$ channel matrices for the E=3 elevation beams, $V_A$, $V_B$, and $V_C$ are the M×r azimuth CB matrices where r is the rank, and $v_p$ is the E×1 vector of elevation weights, and $I_r$ is a r×r identity matrix. To determine $V_A$, $V_B$, and $V_C$ the mobile can use $H_A(k)$, $H_B(k)$, and $H_C(k)$ respectively. For determining $v_p$ the UE could choose it as the CB vector that maximizes $v_p^H R_e v_p$ where Re is either $$R_e = \sum_{k=1}^{K} \sum_{m=1}^{M} [\{H_A(k)\}_m | \{H_B(k)\}_m | \{H_C(k)\}_m]^T [\{H_A(k)\}_m | \{H_B(k)\}_m | \{H_C(k)\}_m]^* \text{ or}$$

$$R_e = \sum_{k=1}^{K} \sum_{l=1}^{r} [\{H_A(k)V_A\}_l | \{H_B(k)V_B\}_l | \{H_C(k)V_C\}_l]^T [\{H_A(k)V_A\}_l | \{H_B(k)V_B\}_l | \{H_C(k)V_C\}_l]^*$$

where $\{A\}_n$ means the $n^{th}$ column of matrix A.

In an alternate structure than the one just presented there is a different elevation CB chosen for each rank. In this case the received signal at the mobile is given by:

$$y(k) = [H_A(k) | H_B(k) | H_C(k)] \begin{bmatrix} V_A & 0 & 0 \\ 0 & V_B & 0 \\ 0 & 0 & V_C \end{bmatrix} \begin{bmatrix} \text{diag}((V_p)_{1,1}, \ldots, (V_p)_{1,r}) \\ \text{diag}((V_p)_{2,1}, \ldots, (V_p)_{2,r}) \\ \text{diag}((V_p)_{3,1}, \ldots, (V_p)_{3,r}) \end{bmatrix}$$

where $(V_p)_{n,m}$ means the $(n,m)^{th}$ element of $V_p$ and diag($a_1$, $a_2$), ..., $a_r$) is r×r matrix of all zeros except for the main diagonal whose elements are $a_1$ through $a_r$. Note that in this case the elevation CB is E×r instead of E×1 in the previous example.

In a particular case a UE may not have access to $H_A(k)$, $H_B(k)$, and $H_C(k)$ separately and then may assume $H_A(k)=H_B(k)=H_C(k)$. In such a case it may consider $V_A=V_B=V=V_C$. This can be treated as a special case for the above examples.

Note that some benefits of the above product structure of the CB are: 1) The CB sizes are small since E and M are typically small and hence feedback needed is small, 2) The CBs already defined in LTE can be reused for the azimuth and elevation CBs as long as M and E are either 2, 4 or 8, 3) the complexity of the CB search at the mobile is low since the search can be broken up into two searches, one for the elevation CB and the other for the azimuth CB, and 4) the orthogonality between the different streams in the rank>1 case can be preserved as long as the rank>1 azimuth CB already were orthogonal between streams.

One choice for the elevation CB vectors for E=2 could be the CB defined in 3GPP LTE Rel-8 or it could be the columns of the following matrix (for a two bit CB). Note that a scalar multiplier may be used with the following codebook examples without any change of performance.

$$\begin{bmatrix} 1 & 1 & 1 & 1 \\ 1 & -1 & j & -j \end{bmatrix}$$

A choice for the elevation CB vectors for E=3 could be the columns of the following matrix (for a four bit CB).

$$\begin{bmatrix} 1 & 1 & 1 & 1 & 1 & 1 & 1 & 1 & 1 & 1 & 1 & 1 & 1 & 1 & 1 & 1 \\ 1 & 1 & 1 & 1 & -1 & -1 & -1 & -1 & j & j & j & j & -j & -j & -j & -j \\ 1 & -1 & j & -j & 1 & -1 & j & -j & 1 & -1 & j & -j & 1 & -1 & j & -j \end{bmatrix}.$$

A choice for the elevation CB vectors for E=4 could be the CB defined in 3GPP LTE. Rel-8 or it could be the columns of the following matrix (for a four bit CB):

$$\begin{bmatrix} 1 & 1 & 1 & 1 & 1 & 1 & 1 & 1 & 1 & 1 & 1 & 1 & 1 & 1 & 1 \\ -1 & -1 & -j & 1 & j & 1 & -1 & j & -j & -1 & -j & j & -j & 1 & 1 & j \\ -1 & j & 1 & -1 & j & j & -j & -j & -j & 1 & j & 1 & -1 & 1 & -j & -1 \\ -1 & -j & -j & 1 & 1 & j & j & -1 & 1 & 1 & -1 & j & j & -1 & -j & -j \end{bmatrix}.$$

In addition to the above mentioned examples, virtual antenna or beam selection entries may also be included as codebook elements. An example of such antenna or beam selection entries for E=2 are the columns of $$\begin{bmatrix} 1 & 0 \\ 0 & 1 \end{bmatrix}.$$

For the azimuth CBs (e.g. $V_A$-$V_C$ in the examples above), the same codebooks as the above elevation ones could be used for rank 1, the existing 3GPP LTE CBs could be used for any rank, or any appropriately defined CB could be used.

Also note that in this and other codebook feedback strategies, the UE determines and feeds back a preferred precoder matrix index, which indicates which entry in the codebook is the precoder matrix that the UE has selected. The eNB may calculate its transmit weights based on the fed back precoder matrix index. In the discussion here, the UE will determine and feed back an index of the azimuth codebook (azimuth precoder matrix index) to indicate which precoder matrix is preferred. The UE will also determine and feed back an index of the elevation codebook (elevation precoder matrix index) to indicate which precoder matrix is preferred. In the discussion herein, the terms "azimuth portion of a codebook" and "elevation portion of a codebook" refer to the azimuth codebook and the elevation codebook, respectively, when the overall codebook has been partitioned into a separate azimuth codebook and a separate elevation codebook.

Figure 8:
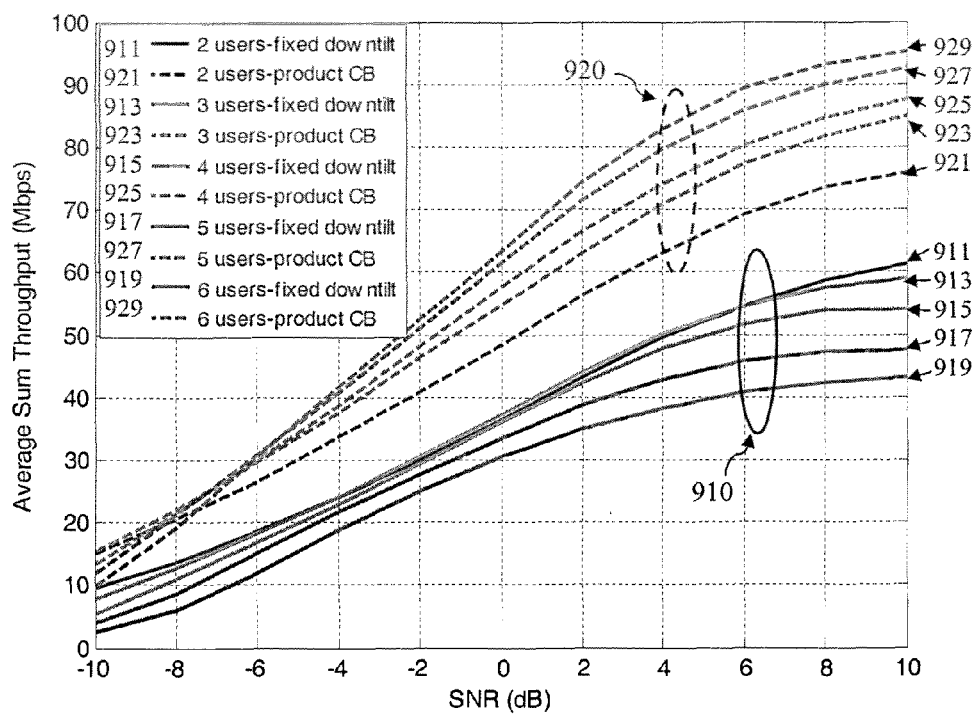
FIG. 8 demonstrates SNR vs. throughput for various numbers of users.

FIG. 8 demonstrates SNR vs. throughput for various numbers of MU-MIMO users. The sets may be separated into two groups: a first group 910 using a fixed downtilt and a second group 920 using an exemplary product codebook for joint elevation and azimuth beamforming. The first and second group provides details for 2 users (911, 921), 3 users (913, 923), 4 users (915, 925), 5 users (917, 927) and 6 users (919, 929). The product codebook provides approximately 67% throughput gains over the fixed downtilt technique.

An exemplary embodiment provides a method of operating an array of antennas in a wireless communication system to provide user-specific azimuth and elevation beamforming. The method includes providing a product codebook structure consisting of both an azimuth and elevation portion (e.g., an azimuth-oriented codebook and an elevation-oriented codebook). A receiver (e.g., of a UE) receives reference signals from a transmitter (e.g., of an eNB) corresponding to both the azimuth and elevation portions of the array of antennas. The method also includes determining the index of the azimuth codebook portion of the product codebook (e.g., the azimuth precoder matrix index or a-PMI) from the azimuth portion of the received reference signals and determining the index of the elevation codebook portion of the product codebook (e.g. the elevation precoder matrix index or e-PMI) from the elevation portion of the received reference signals.

In a further embodiment of the method above, separate elevation codebooks are used for each azimuthal antenna.

In another embodiment of the method above, the method also includes providing feedback based on the azimuth codebook portion (e.g., the azimuth-oriented Codebook) and the elevation codebook portion (e.g., the elevation-oriented Codebook). The feedback may include an azimuth precoder matrix index and/or an elevation precoder matrix index. The feedback may be a rank 2 feedback and/or CQI based on the selected azimuth and elevation codebook indices.

In another embodiment of the method above, the method also includes providing feedback which indicates the rank to use for the beamformed transmission.

A further exemplary embodiment provides a method of operating an array of antennas in a wireless communication system to provide user-specific azimuth and elevation beamforming. The method includes being provided a product codebook structure consisting of both an azimuth and elevation portion (e.g., an azimuth-oriented codebook and an elevation-oriented codebook). Feedback from a UE is received. The feedback includes a codebook index selection for azimuth and a codebook index selection for elevation. The method also includes beamforming in the elevation direction based on the elevation portion of the codebook and beamforming in the azimuth direction based on the azimuth portion of the codebook.

In another embodiment of the method above, separate elevation codebooks are used for each azimuthal antenna.

In another embodiment of the method above, the feedback from the UE is combined to form one set of weights that is used to control the beamforming of the array of antennas. The combination of the feedback may be the kronecker product of the elevation codebook index fed back from the UE with the azimuth codebook index fed back from the UE, or the combination of the feedback may the product of the entries of the elevation codebook with all or a some subset of the entries of the azimuth codebook.

In a further embodiment of the method above, the method also includes providing feedback based on the azimuth codebook portion and the elevation codebook portion. The feedback may be include an azimuth precoder matrix index (index to the azimuth portion of the codebook) and/or an elevation precoder matrix index (index to the elevation portion of the codebook). The feedback may be a rank 2 feedback and/or CQI based on the selected azimuth and elevation codebook indices. The feedback may also include a rank indication from the UE for the selected azimuth CB index and elevation CB index.

Based on the foregoing it should be apparent that various exemplary embodiments provide a method, apparatus and computer program(s) to utilize a codebook structure for joint elevation and azimuth beamforming.

Figure 10:
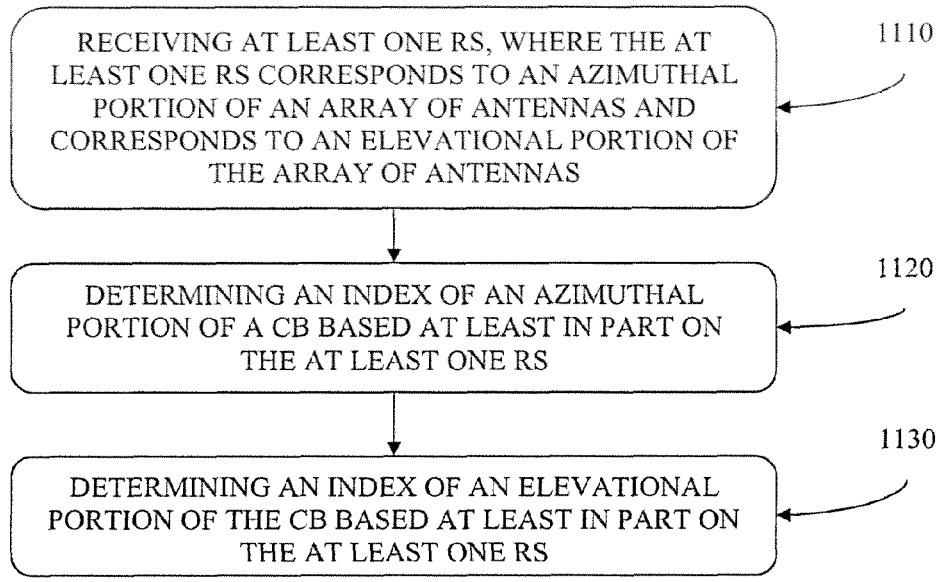
FIG. 10 is a logic flow diagram that illustrates the operation of an exemplary method, and a result of execution of computer program instructions embodied on a computer readable memory, in accordance with various exemplary embodiments.

FIG. 10 is a logic flow diagram that illustrates the operation of a method, and a result of execution of computer program instructions, in accordance with exemplary embodiments. In accordance with these exemplary embodiments a method performs, at Block 1110, a step of receiving at least one RS, where the at least one RS corresponds to an azimuthal portion of an array of antennas and corresponds to an elevational portion of the array of antennas. The method also performs, at Block 1120, a step of determining an index of an azimuthal portion of a CB based at least in part on the at least one RS and, at Block 1130, a step of determining an index of an elevational portion of the CB based at least in part on the at least one RS.

Figure 11:
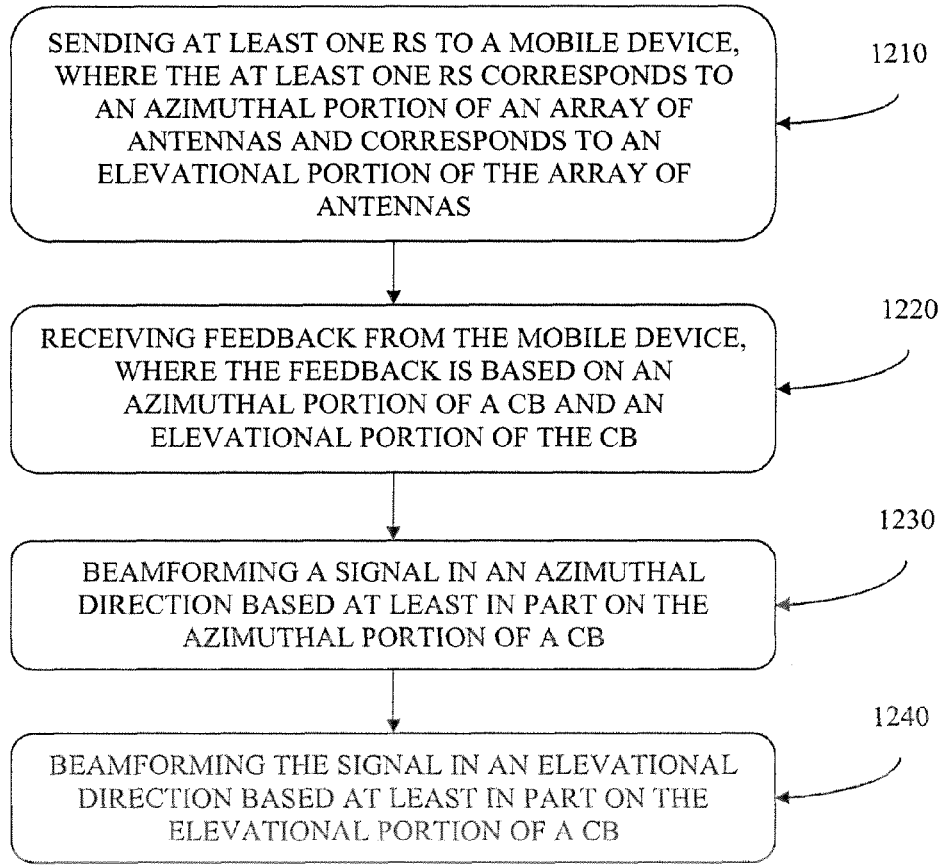
FIG. 11 is another logic flow diagram that illustrates the operation of an exemplary method, and a result of execution of computer program instructions embodied on a computer readable memory, in accordance with various exemplary embodiments.

FIG. 11 is a logic flow diagram that illustrates the operation of a method, and a result of execution of computer program instructions, in accordance with exemplary embodiments. In accordance with these exemplary embodiments a method performs, at Block 1210, a step of sending at least one RS to a mobile device. The at least one RS corresponds to an azimuthal portion of an array of antennas and corresponds to an elevational portion of the array of antennas. A step of receiving feedback from the mobile device, where the feedback is based on an azimuthal portion of a CB (e.g., an index to the azimuth portion of the codebook) and an elevational portion of the CB (e.g. an index to the elevation portion of the codebook), is performed by the method at Block 1220. The method also performs a step of beamforming a signal in an azimuthal direction based at least in part on the azimuthal portion of a CB (e.g., the index to the azimuth portion of the codebook that was fed back by the UE), at Block 1230, and, at Block 1240, beamforming the signal in an elevational direction based at least in part on the elevational portion of a CB (e.g., the index to the elevation portion of the codebook that was fed back by the UE).

The various blocks shown in FIGS. 10 and 11 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

An exemplary embodiment provides a method for utilizing a codebook structure for joint elevation and azimuth beamforming. The method includes receiving (e.g., by a receiver) at least one RS. The at least one RS corresponds to an azimuthal portion of an array of antennas and corresponds to an elevational portion of the array of antennas. The method also includes determining (e.g. by a processor) an index of an azimuthal portion of a CB based at least in part on the at least one RS and determining (e.g. by a processor) an index of an elevational portion of the CB based a least in part on the at least one RS.

In another exemplary embodiment of the method above, the CB is a product CB.

In a further exemplary embodiment of any one of the methods above, the method also includes generating feedback based on the determined index of the azimuthal portion of the CB and the determined index of the elevational portion of the CB. The method may also include sending the feedback to an access point. Sending the feedback may include sending feedback based on the determined azimuthal portion of the CB (e.g., an index to the azimuth portion of the codebook) at a first rate and sending feedback based on the determined elevational portion of the CB (e.g., an index to the elevation portion of the codebook) at a different, second rate. The feedback may include a rank indication, a CQI and/or a PMI.

In another exemplary embodiment of any one of the methods above, the index of the azimuthal portion of a CB is determined at a different rate than the index of the elevational portion of the CB is determined.

In a further exemplary embodiment of any one of the methods above, the at least one RS includes a first RS corresponding to the azimuthal portion of the array of antennas and a second RS corresponding to the elevational portion of the array of antennas. Determining the index of the azimuthal portion of the CB may be based on the first RS and determining the index of the elevational portion of the CB may be based on the second RS.

Another exemplary embodiment provides a method for utilizing a codebook structure for joint elevation and azimuth beamforming. The method includes sending (e.g., by a transmitter) at least one RS to a mobile device. The at least one RS corresponds to an azimuthal portion of an array of antennas and corresponds to an elevational portion of the array of antennas. Receiving (e.g., by a receiver) feedback from the mobile device is included in the method. The feedback is based on an azimuthal portion of a CB (e.g., an index to the azimuth portion of the codebook) and an elevational portion of the CB (e.g., an index to the elevation portion of the codebook). The method also includes beamforming (e.g., by a processor) a signal in an azimuthal direction based at least in part on the azimuthal portion of a CB (e.g. based on the index to the azimuth portion of the codebook that was fed back by the UE) and beamforming (e.g., by a processor) the signal in an elevational direction based at least in part on the elevational portion of a CB (e.g., based on the index to the elevation portion of the codebook that was fed back by the UE).

In a further exemplary embodiment of the method above, the CB is a product CB.

In another exemplary embodiment of any one of the methods above, receiving the feedback includes receiving feedback based on the determined index of the azimuthal portion of the CB at a first rate and receiving feedback based on the determined index of the elevational portion of the CB at a different, second rate.

In a further exemplary embodiment of any one of the methods above, the feedback includes a rank indication, a CQI and/or a PMI.

In another exemplary embodiment of any one of the methods above, the at least one RS comprises a first RS corresponding to the azimuthal portion of the array of antennas and a second RS corresponding to the elevational portion of the array of antennas.

In a further exemplary embodiment of any one of the methods above, the signal is beamformed in the azimuthal direction prior to being beamformed in the elevational direction.

Another exemplary embodiment provides an apparatus for utilizing a codebook structure for joint elevation and azimuth beamforming. The apparatus includes at least one processor and at least one memory storing computer program code. The at least one memory and the computer program code are configured to, with the at least one processor, cause the apparatus to perform actions. The actions include receiving at least one RS. The at least one RS corresponds to an azimuthal portion of an array of antennas and corresponds to an elevational portion of the array of antennas. The actions also include determining an index of an azimuthal portion of a CB based at least in part on the at least one RS and determining an index of an elevational portion of the CB based at least in part on the at least one RS.

In a further exemplary embodiment of any one of the apparatus above, the apparatus is embodied in an integrated circuit.

In another exemplary embodiment of any one of the apparatus above, the apparatus is embodied in a mobile device.

A further exemplary embodiment provides an apparatus for utilizing a codebook structure for joint elevation and azimuth beamforming. The apparatus includes at least one processor and at least one memory storing computer program code. The at least one memory and the computer program code are configured to, with the at least one processor, cause the apparatus to perform actions. The actions include sending at least one RS to a mobile device. The at least one RS corresponds to an azimuthal portion of an array of antennas and corresponds to an elevational portion of the array of antennas. Receiving feedback from the mobile device is included in the actions. The feedback is based on an azimuthal portion of a CB (e.g., an index to the azimuth portion of the codebook) and an elevational portion of the CB (e.g., an index to the elevation portion of the codebook). The actions also include beamforming a signal in an azimuthal direction based at least in part on the azimuthal portion of a CB (e.g., based on the index to the azimuth portion of the codebook that was fed back by the UE) and beamforming the signal in an elevational direction based at least in part on the elevational portion of a CB (e.g., based on the index to the elevation portion of the codebook that was fed back by the UE).

In another exemplary embodiment of the apparatus above, the apparatus is embodied in an integrated circuit.

In a further exemplary embodiment of any one of the apparatus above, the apparatus is embodied in a mobile device.

Another exemplary embodiment provides a computer readable medium (such as MEM 316 for example) for utilizing a codebook structure for joint elevation and azimuth beamforming. The computer readable medium is tangibly encoded with a computer program (such as PROG 318 for example) executable by a processor (such as DP 314 for example) to perform actions. The actions include receiving at least one RS. The at least one RS corresponds to an azimuthal portion of an array of antennas and corresponds to an elevational portion of the array of antennas. The actions also include determining an index of an azimuthal portion of a CB based at least in part on the at least one RS and determining an index of an elevational portion of the CB based at least in part on the at least one RS.

In a further exemplary embodiment of the computer readable medium above, the computer readable medium is a non-transitory computer readable medium (e.g., CD-ROM, RAM, flash memory, etc.).

In another exemplary embodiment of any one of the compute readable media above, the computer readable medium is a storage medium.

A further exemplary embodiment provides a computer readable medium (such as MEM 326 for example) for utilizing a codebook structure for joint elevation and azimuth beamforming. The computer readable medium is tangibly encoded with a computer program (such as PROG 328 for example) executable by a processor (such as DP 324 for example) to perform actions. The actions include sending at least one RS to a mobile device. The at least one RS corresponds to an azimuthal portion of an array of antennas and corresponds to an elevational portion of the array of antennas. Receiving feedback from the mobile device is included in the actions. The feedback is based on an azimuthal portion of a CB (e.g., an index to the azimuth portion of the codebook) and an elevational portion of the CB (e.g., an index to the elevation portion of the codebook). The actions also include beamforming a signal in an azimuthal direction based at least in part on the azimuthal portion of a CB (e.g., based on the index to the azimuth portion of the codebook that was fed back by the UE) and beamforming the signal in an elevational direction based at least in part on the elevational portion of a CB (e.g., based on the index to the elevation portion of the codebook that was fed back by the UE)

In another exemplary embodiment of the computer readable medium above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides an apparatus for utilizing a codebook structure for joint elevation and azimuth beamforming. The apparatus includes means for receiving (e.g., a receiver) at least one RS. The at least one RS corresponds to an azimuthal portion of an array of antennas and corresponds to an elevational portion of the array of antennas. The apparatus also includes means for determining (e.g. a processor) an index of an azimuthal portion of a CB based at least in part on the at least one RS and means for determining (e.g., a processor) an index of an elevational portion of the CB based at least in part on the at least one RS.

A further exemplary embodiment provides an apparatus for utilizing a codebook structure for joint elevation and azimuth beamforming. The apparatus includes means for sending (e.g., a transmitter) at least one RS to a mobile device. The at least one RS corresponds to an azimuthal portion of an array of antennas and corresponds to an elevational portion of the array of antennas. Means for receiving (e.g., a receiver) feedback from the mobile device is included in the apparatus. The feedback is based on an azimuthal portion of a CB (e.g., an index to the azimuth portion of the codebook) and an elevational portion of the CB (e.g., an index to the elevation portion of the codebook). The apparatus also includes means for beamforming (e.g., a processor) a signal in an azimuthal direction based at least in part on the azimuthal portion of a CB (e.g., based on the index to the azimuth portion of the codebook that was fed back by the UE) and means for beamforming (e.g., a processor) the signal in an elevational direction based at least in part on the elevational portion of a CB (e.g., based on the index to the elevation portion of the codebook that was fed back by the UE).

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

For example, while the exemplary embodiments have been described above in the context of the E-UTRAN (UTRAN-LTE) system, it should be appreciated that the exemplary embodiments are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CQI, PMI, etc.) are not intended to be limiting in any respect, as these parameters may be identified by any suitable names. Further, the formulas and expressions that use these various parameters may differ from those expressly disclosed herein.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

What is claimed is:

1. A method comprising:
    receiving at least one reference signal for an azimuthal portion of an array of antennas and at least one reference signal for an elevational portion of the array of antennas;
    determining a rank based on both the at least one reference signal for the azimuthal portion of the array of antennas and the at least one reference signal for the elevational portion of the array of antennas;
    determining an index of an azimuthal portion of a codebook based at least in part on the determined rank;
    determining an index of an elevational portion of the codebook based at least in part on the determined rank;
    determining channel quality information based at least on both the index of the azimuthal portion of a codebook and the index of the elevational portion of the codebook; and
    sending indications of at least the determined rank and the determined channel quality information.

2. The method of claim 1, where the codebook is a product codebook.

3. The method of claim 1, wherein sending indications sending the indications to an access point.

4. The method of claim 1, where sending the indications comprises sending indexes based on the azimuthal portion of the codebook at a first rate and sending indexes based on the elevational portion of the codebook at a different, second rate.

5. The method of claim 1, where the index of the azimuthal portion of a codebook is determined at a different rate than the index of the elevational portion of the codebook is determined.

6. The method of claim 1, where determining the index of the azimuthal portion of the codebook is based on the at least one reference signal for the azimuthal portion of the array and determining the index of the elevational portion of the codebook is based on the at least one reference signal for the elevational portion of the array.

7. The method of claim 1, wherein the method further comprises determining at least one of a plurality of subbands based at least on both the index of the azimuthal portion of the codebook and the index of the elevational portion of the codebook, and wherein feeding back further comprises feeding back the determined at least one subband.

8. A non-transitory computer readable medium tangibly encoded with a computer program executable by a processor to perform actions to implement the method of claim 1.

9. A method comprising:
sending to a mobile device at least one reference signal for an azimuthal portion of an array of antennas and at least one signal for an elevational portion of the array of antennas;
receiving indications at least of a rank and a channel quality information from the mobile device, where both the rank and the channel quality information are based on both the at least one reference signal for the azimuthal portion of the array of antennas and the at least one reference signal for the elevational portion of the array of antennas; and
beamforming a signal in an azimuthal and an elevational direction based at least in part on the rank and channel quality information.

10. The method of claim 9, where the codebook is a product codebook.

11. The method of claim 9, where receiving the indications further comprises receiving indexes based on the azimuthal portion of the codebook at a first rate and receiving indexes based on the elevational portion of the codebook at a different, second rate.

12. The method of claim 9, where the signal is beamformed in the azimuthal direction prior to being beamformed in the elevational direction.

13. A non-transitory computer readable medium tangibly encoded with a computer program executable by a processor to perform actions to implement the method of claim 9.

14. An apparatus, comprising at least one processor; and at least one memory including computer program code, the at least one memory and the computer program code configured to, with the at least one processor, cause the apparatus to perform at least the following:
to receive at least one reference signal for an azimuthal portion of an array of antennas and at least one reference signal for an elevational portion of the array of antennas;
to determine a rank based on both the at least one reference signal for the azimuthal portion of the array of antennas and the at least one reference signal for the elevational portion of the array of antennas;
to determine an index of an azimuthal portion of a codebook based at least in part on the determined rank;
to determine an index of an elevational portion of the codebook based at least in part on the determined rank;
to determine channel quality information based at least on both the index of the azimuthal portion of a codebook and the index of the elevational portion of the codebook; and
to send indications of at least the determined rank and the determined channel quality information.

15. The apparatus of claim 14, where the index of the azimuthal portion of a codebook is determined at a different rate than the index of the elevational portion of the codebook is determined.

16. An apparatus, comprising at least one processor; and at least one non-transitory memory including computer program code, the at least one non-transitory memory and the computer program code configured to, with the at least one processor, cause the apparatus to perform at least the following:
to send to a mobile device at least one reference signal for an azimuthal portion of an array of antennas and at least one signal for an elevational portion of the array of antennas;
to receive indications at least of a rank and a channel quality information from the mobile device, where both the rank and the channel quality information are based on both the at least one reference signal for the azimuthal portion of the array of antennas and the at least one reference signal for the elevational portion of the array of antennas; and
to beamform a signal in an azimuthal and an elevational direction based at least in part on the rank and channel quality information.

17. The apparatus of claim 16, where, when receiving the indications the at least one memory and the computer program code are further configured to cause the apparatus to receive indexes based on the azimuthal portion of the codebook at a first rate and to receive indexes based on the elevational portion of the codebook at a different, second rate.

* * * * *